Watson, Milsom & Spendelow,
Hoisting Bucket.
Nº 45,197. Patented Nov. 22, 1864.
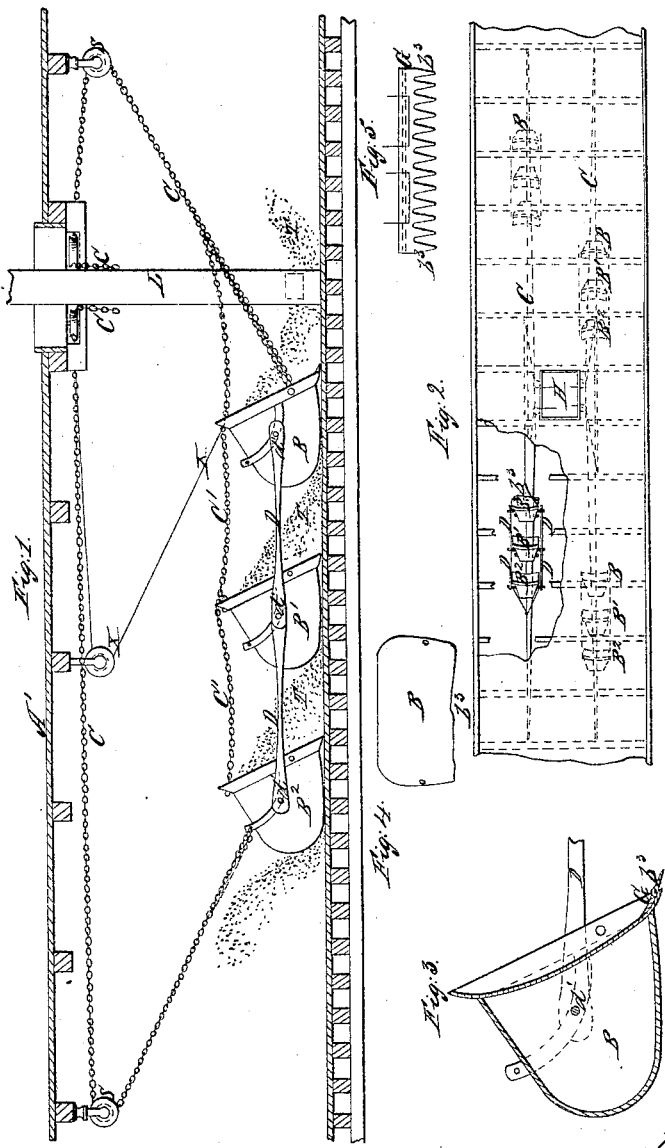
Witnesses:
M. P. Fillmore
E. B. Forbush
Inventors:
Geo. Watson
George Milsom
Henry Spendelow

UNITED STATES PATENT OFFICE.

GEORGE V. WATSON, GEORGE MILSOM, AND HENRY SPENDELOW, OF BUFFALO, NEW YORK.

IMPROVED GRAIN-SHOVEL.

Specification forming part of Letters Patent No. 45,197, dated November 22, 1864.

*To all whom it may concern:*

Be it known that we, GEORGE V. WATSON, GEORGE MILSOM, and HENRY SPENDELOW, of the city of Buffalo, county of Erie, and State of New York, have invented an improved grain-scraper or shovel and an improvement in the manner of connecting and operating two or more shovels or scrapers in line, or one in advance of the other; and we do hereby declare that the following is a full and exact description thereof, reference being had to the accompanying drawings, making a part of this specification, in which—

Figure I is a longitudinal section of a vessel in which our improved scrapers are placed, the scrapers being shown in elevation and in working position. Fig. II is a top plan of the same. Fig. III is a vertical longitudinal section of one of the scrapers, having a jointed entering piece. Fig. IV is a front elevation of a scraper having entering prongs or serrations, and Fig. V is a plan of a front entering piece having prongs or serrations for more easily entering the grain to take on its load.

The nature of this invention relates, first, to constructing and operating two, three, or more scrapers within the hold of the vessel where the grain is, which scrapers move back and forth upon the grain and scrape it along to the elevator-leg, as distinguished from the construction and operation of scoops or buckets, which take up the grain and carry it forward to the elevating-leg; second, to making the scraper forked or serrated at its entering edge; third, making a scraper having a jointed or hinged entering piece; fourth, making the rear part of the scraper oval or runner shape, so that in its reverse movement it will slide easily over the grain; fifth, placing and operating two or more scrapers on one chain or line, and giving said scrapers a short vibrating motion, so that one scraper will deliver its load to the one next in advance of it, and so on until the end scraper delivers to the elevating-leg; sixth, arranging two or more scrapers in line, so as to leave a clear space between them for the grain to flow in into the track of the scrapers; seventh, connecting these scrapers, thus arranged, by stiff bars on each side, jointed and hinged to the scrapers, so as to allow of a free movement upon the joints and yet keep the scrapers an equal distance apart, and so that, if power is applied only to the forward scraper, it will be communicated through these stiff bars to each scraper in the line; eighth, arranging and operating these scrapers in the four quarters of the vessel simultaneously, so that the vessel may be unloaded evenly and without "listing" or "careening."

Letters of like name and kind refer to like parts in each of the figures.

A represents a longitudinal quarter-section of the hull of a grain-vessel, and A' the deck of the same.

B B' B² represent three of our improved scrapers, arranged in line for operating together. These scrapers have several distinct features in their construction and operation. The front part of the scraper is made dishing, so that as it moves forward it will scrape or move along a large body of grain in front of it, while the rear part is made light and oval or runner-shaped in its exterior form, so that in its reverse or backward movement it will slide over easily on the surface of the grain without moving or scraping the grain backward.

The front or entering edge of the scraper is serrated, or has forks or prongs $b^3$, projecting, so that it will easily enter the grain, or, in case it is used for coal or other like commodities, the prongs will find their way between the lumps and allow the scraper to fill easily. In case the grain has become matted by reason of heat or moisture, then these prongs are of great service in aiding the scraper to fill, and in case the scrapers are used for unloading coal and the like they will penetrate between the lumps of coal, and thereby easily fill the scraper. They may be made in or on the front edge of the entering plate when such plate is rigidly connected with and forms a part of the scraper, or the front entering plate may be made separate from the other parts of the scraper, and then hinged or jointed thereto, as shown at G, Figs. III and V. When hinged as just described, the hinged plate will slide more easily over and carry less grain back in the backward movement than if rigidly connected with the scraper.

Two, three, or more of these scrapers are connected with and operated by one chain C as shown the drawings.

In the practical operation of these scrapers they move upon and scrape along the grain to the elevating-leg, as distinguished and differing from scooping or lifting up and carrying the grain to the elevating-leg. They commence their operation on the top of the grain and follow down the grain as it is removed from the vessel. They slide upon the grain and scrape the grain to the elevating-leg in their forward movements, but slide over and upon the grain in their backward movement without scraping the grain back. They keep upon the surface of the grain until the grain is so far unloaded that they will slide upon the bottom of the vessel, and by reason of this scraping principle we are enabled to give the scrapers a short vibrating motion, and hence work them more easily and rapidly than we can scoops which lift and carry the grain, and hence move through greater distance. A chain, C', runs from scraper to scraper over or at the top of each, connecting them together, as shown in the drawings. We also connect the scrapers together by means of a stiff bar, D, on either side, which bars are jointed or hinged to the side of the scraper, as shown at $d'$. These bars will serve to keep the scrapers an equal distance apart and also leave a clear space between the scrapers for the grain to flow in as the scrapers move along, so that the scrapers can easily load themselves at each forward movement. The chains C connect with windlass drums and brakes, and are operated in the same manner as described in our patent of August 2, 1864, to which reference is herewith made for further details thereof.

By means of such apparatus the scrapers may be given a long or a short movement, as required.

When only one scoop is used on the line of chain, then the scoop must move through a greater and an increasing distance in order to carry the grain from all parts of the vessel to the elevating-leg; but when two, three, or more scrapers are used, as herein described, then a shorter movement is given—to wit, a movement equal to the distance the scrapers are apart on the line—so that one scraper will deliver its load in such place that the scraper next forward of it will take it at the next forward movement, and so on, the front scraper delivering its load to the elevating-leg at the end of each forward movement, and hence grain may be delivered to the elevating-leg by a shorter movement and more rapidly by the use of three or more scrapers in line than can be done with only one scraper or scoop on the line.

By means of connecting the scrapers together by the stiff bars D we are enabled to shorten the line of operating-chain by moving the rear sheave farther toward the hatch of the vessel and connecting the chain to the front scraper, as shown by the red lines X.

These scrapers are arranged in the four quarters of the vessel where the grain is, as shown in Fig. II, so that they may all be operated at the same time, and thereby unload the vessel evenly and prevent it from listing or careening.

Chains C are connected with each set of scrapers, and are also connected with drums and operating apparatus similar to that described in our said patent of August 2, 1864, and all are operated thereby simultaneously, and thereby the vessel is prevented from straining or careening.

Any method of unloading whereby the grain is taken from one quarter or one half of the vessel first is objectionable, for the reason that the vessel in such case would careen, and consequently strain itself; but our improvement, whereby we are enabled to operate the scrapers in the four quarters of the vessel at the same time remedies this objection.

H represents the hatch; L, elevating-leg; S, sheaves; T, grain.

What we claim as our invention, and desire to secure by Letters Patent, is—

1. Making a scraper or shovel having a jointed or hinged entering piece, for the purposes and substantially as described.

2. Placing and operating two, three, or more scrapers on one chain or line and imparting to said scrapers a short vibrating motion, so that one scraper will deliver its load to the one next in advance of it, and so on until the end scraper delivers to the elevating-leg, substantially as described.

3. Arranging two or more scrapers in line so as to leave a clear space between them, so as to allow the grain to flow in between them and into their track, as set forth.

4. Connecting these scrapers thus arranged by stiff bars D on each side, jointed and hinged to the scrapers, so as to allow of a free movement upon the joints and yet keep the scrapers an equal distance apart, and so that if power is applied to the forward scraper only it will be communicated through these stiff bars to each scraper in the line.

5. Arranging and operating the scrapers in the four quarters of the vessel simultaneously, for the purposes and substantially as described.

6. Imparting to the scrapers a vibrating motion, whereby the scrapers shall be caused to scrape the grain to the elevating-leg, for the purposes and substantially as herein described.

GEO. V. WATSON.
GEORGE MILSOM.
HENRY SPENDELOW.

Witnesses:
M. P. FILLMORE,
E. B. FORBUSH.